(12) United States Patent
Beaurepaire et al.

(10) Patent No.: US 9,678,660 B2
(45) Date of Patent: Jun. 13, 2017

(54) METHOD AND APPARATUS FOR CONVEYING EFFICIENT MAP PANNING OVER A MAPPING USER INTERFACE

(71) Applicants: Jerome Beaurepaire, Berlin (DE); Maguy Jamain, Berlin (DE)

(72) Inventors: Jerome Beaurepaire, Berlin (DE); Maguy Jamain, Berlin (DE)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 13/669,109

(22) Filed: Nov. 5, 2012

(65) Prior Publication Data

US 2014/0129976 A1   May 8, 2014

(51) Int. Cl.
| | | |
|---|---|---|
| *G06F 3/048* | (2013.01) | |
| *G06F 3/0488* | (2013.01) | |
| *G01C 21/36* | (2006.01) | |
| *G06F 3/0485* | (2013.01) | |

(52) U.S. Cl.
CPC ....... *G06F 3/04883* (2013.01); *G01C 21/367* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 6,175,801 B1 | 1/2001 | Millington | |
| 6,321,158 B1 * | 11/2001 | DeLorme et al. | 701/426 |
| 6,456,938 B1 * | 9/2002 | Barnard | 701/454 |
| 7,933,395 B1 * | 4/2011 | Bailly et al. | 379/201.04 |
| 8,468,469 B1 * | 6/2013 | Mendis et al. | 715/863 |
| 2001/0045949 A1 * | 11/2001 | Chithambaram et al. | 345/418 |
| 2004/0183700 A1 | 9/2004 | Morie | |
| 2007/0083325 A1 | 4/2007 | Baba et al. | |
| 2009/0088964 A1 | 4/2009 | Schaaf et al. | |
| 2009/0119009 A1 * | 5/2009 | Dicke | G01C 21/30 701/533 |

(Continued)

FOREIGN PATENT DOCUMENTS

| | | |
|---|---|---|
| EP | 2236986 A2 | 10/2010 |
| EP | 2 413 301 A1 | 2/2012 |
| WO | 2007105500 A1 | 9/2007 |

OTHER PUBLICATIONS

A. Pomp, "Smartphone-Based Indoor Mapping," Bachelor Thesis, RWTH Aachen University, Germany, Mar. 16, 2012, pp. 1-62.

(Continued)

*Primary Examiner* — Tuan S Nguyen
(74) *Attorney, Agent, or Firm* — Ditthavong & Steiner, P.C.

(57) ABSTRACT

An approach is provided for processing one or more user interactions and/or user gestures with the user interface element to a cause panning for specifying routes with location anchors for streets. A panning platform determines an input for specifying at least one panning operation over a mapping user interface. Next, the panning platform determines one or more map features rendered in the mapping user interface. Subsequently, the panning platform processes and/or facilitates a processing of the one or more map features to determine one or more parameters for the at least one panning operation, wherein the at least one panning operation includes a recentering of the mapping user interface.

20 Claims, 15 Drawing Sheets

(56) References Cited

U.S. PATENT DOCUMENTS

| | | | |
|---|---|---|---|
| 2009/0128483 A1* | 5/2009 | Robbins et al. | 345/156 |
| 2009/0144247 A1 | 6/2009 | Wistrand et al. | |
| 2009/0281720 A1* | 11/2009 | Jakobson | 701/202 |
| 2010/0094548 A1* | 4/2010 | Tadman et al. | 701/209 |
| 2010/0123737 A1* | 5/2010 | Williamson et al. | 345/672 |
| 2010/0311523 A1* | 12/2010 | Balardeta et al. | 473/407 |
| 2011/0015857 A1 | 1/2011 | Uotani et al. | |
| 2011/0257546 A1 | 10/2011 | Gozzini et al. | |
| 2012/0022787 A1* | 1/2012 | LeBeau et al. | 701/527 |
| 2012/0032974 A1 | 2/2012 | Lynch | |
| 2013/0103313 A1* | 4/2013 | Moore et al. | 701/533 |
| 2014/0118404 A1* | 5/2014 | Griffin | G06F 3/0481 345/660 |

OTHER PUBLICATIONS

Notification of Transmittal of the International Search Report and the Written Opinion of the International Searching Authority, or the Declaration; International Search Report; Written Opinion for corresponding Application No. PCT/FI2013/051029 dated Feb. 14, 2014, 14 pages.

Office Action for corresponding European Patent Application No. 13852268.5-1557, dated Jun. 27, 2016, 10 pages.

Office Action for corresponding European Patent Application No. 13 852 268.5-1557, dated Feb. 20, 2017, 8 pages.

* cited by examiner

METHOD AND APPARATUS FOR CONVEYING EFFICIENT MAP PANNING OVER A MAPPING USER INTERFACE

BACKGROUND

Service providers and device manufacturers (e.g., wireless, cellular, etc.) are continually challenged to deliver value and convenience to consumers by, for example, providing compelling network services. One area of interest is providing device users with on demand access to routing information such as maps, routes and point of interest (POI) data. Typically, route options are shown either as lines on a map, as a list of navigation directions or as a graphical depiction of streets, highways, location anchors etc., associated with a given location. Unfortunately, there is currently no convenient means of enabling users to restrict a panning over a mapping user interface to view a route based, at least in part, on user interaction. In addition, users are limited in their ability to view a path and/or boundary for streets because the mapping user interface is not centered.

SOME EXAMPLE EMBODIMENTS

Therefore, there is a need for an approach for processing one or more user interactions and/or user gestures with the user interface element to a cause panning for specifying routes with location anchors for streets, and causing a recentering of the mapping user interface based, at least in part, on the one or more location anchors.

According to one embodiment, a method comprises determining an input for specifying at least one panning operation over a mapping user interface. The method also comprises determining one or more map features rendered in the mapping user interface. The method further comprises processing and/or facilitating a processing of the one or more map features to determine one or more parameters for the at least one panning operation.

According to another embodiment, an apparatus comprises at least one processor, and at least one memory including computer program code for one or more computer programs, the at least one memory and the computer program code configured to, with the at least one processor, cause, at least in part, the apparatus to determine an input for specifying at least one panning operation over a mapping user interface. The apparatus is also caused to determine one or more map features rendered in the mapping user interface. The apparatus is further caused to process and/or facilitate a processing of the one or more map features to determine one or more parameters for the at least one panning operation.

According to another embodiment, a computer-readable storage medium carries one or more sequences of one or more instructions which, when executed by one or more processors, cause, at least in part, an apparatus to determine an input for specifying at least one panning operation over a mapping user interface. The apparatus is also caused to determine one or more map features rendered in the mapping user interface. The apparatus is further caused to process and/or facilitate a processing of the one or more map features to determine one or more parameters for the at least one panning operation.

According to another embodiment, an apparatus comprises means for determining an input for specifying at least one panning operation over a mapping user interface. The apparatus also comprises means for determining one or more map features rendered in the mapping user interface. The apparatus further comprises means for processing and/or facilitating a processing of the one or more map features to determine one or more parameters for the at least one panning operation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for allowing the users of a mobile communication device to confine the panning of a map to the desired route are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
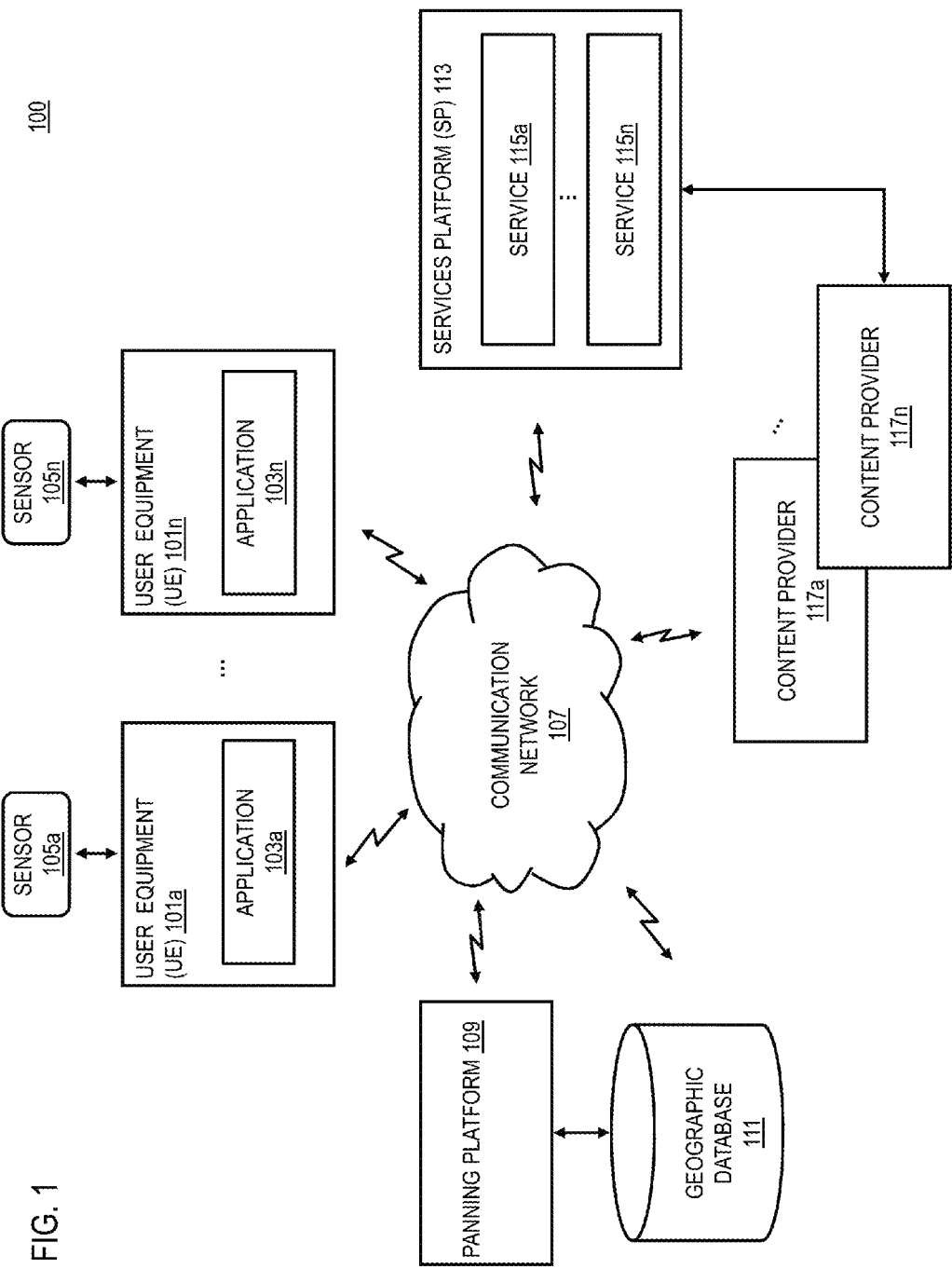
FIG. 1 is a diagram of a system capable of enabling a user to control the panning of a map to a desired street or route, according to one embodiment.

FIG. 1 is a diagram of a system capable of enabling a user to control the panning of a map to a desired street or route, according to one embodiment. By way of example, a panning may pertain to different viewpoint of a geographic location, the surroundings or various streets corresponding to the location. As noted previously, device users regularly rely on routing applications and corresponding services to access information regarding a travel route. By way of such tools, users may access maps for detailing the route, navigation directions, information regarding various streets (e.g., landmarks, location anchors) they may encounter, etc. Typically, the routing option is visually depicted as various lines or objects presented to map. In addition, various textual elements may be presented along the map to represent the names of routes in addition to a list of navigation directions. However, the service providers and device manufacturers (e.g., wireless, cellular, etc.) are continually challenged to provide compelling network services, that may include, map panning services that enables the users of UE 101 to restrict the panning to the desired route. As mentioned, one big challenge with the most routing applications and services is their limited ability to enable users to limit the panning of a map to a location of their choice, such panning is made more difficult when the geometry of the route is complex. For example, the user may be presented with a map of a geographical area, because only fixed positions may be viewed, users are limited in their ability to navigate an interactive map to view streets of their choice. In addition, the problem of correlating a map of a geographical area to its real life counterpart multiplies when the street is located in a congested geographic area.

To address these issues, a system 100 of FIG. 1 introduces the capability to provide the users with the ability to restrict the panning to the desired route, wherein the panning platform 109 processes and determines the user interaction and/or user gestures with UE 101 to generate the correct panning along the selected route. In one embodiment, the system 100 makes the identification of streets easier by providing visual representation of, for instance, buildings, location anchors, routes etc. associated with the streets. For example, a street may be determined based on user interaction and/or user gestures coupled with location information (e.g., proximity information, historical user information, predicted user information, contextual information, location-based content information etc.) associated with the UE 101. In this way, the system 100 can present a visual representation of a street on a mapping user interface of UE 101, to enable a user to identify the street in the real life environment just by looking at the map user interface.

In one embodiment, the system 100 may process the content information (e.g., one or more geo-routes, one or more location anchors, etc.) of UE 101 to determine a street that is associated with user interaction and/or user gestures, to cause a generation of a presentation of direction-finding information for the determined street in a mapping device. For example, presentation of a route for a street in a mapping device helps users to identify the street simply by looking at the map and scanning the surrounding if needed hence, making it easier to spot the destination. In this way, the system 100 resolves problems associated with typical navigation services, for example, by allowing an association between map panning with the streets and, thus, providing an approach for easy and speedy way-finding techniques.

As shown in FIG. 1, the system 100 comprises user equipment (UEs) 101a-101n (collectively referred to as UE 101) that may include or be associated with applications 103a-103n (collectively referred to as applications 103) and sensors 105a-105n (collectively referred to as sensors 105). In one embodiment, the UEs 101 have connectivity to a panning platform 109 via the communication network 107. In one embodiment, the panning platform 109 performs one or more functions associated with restricting the panning of a map to a route desired by the user of UE 101, and causing a presentation of navigation information for the determined street associated with UE 101, for instance, in conjunction with the applications 103 and/or related services 115a-115n of the services platform 113. By way of example, the applications 103 may be any type of application that is executable at the UE 101, such as mapping applications, navigation applications, and/or any other applications that may use POI information including general applications such as media player applications, social networking applications, content provisioning services, and the like. In one embodiment, one of the applications 103 at the UE 101 may act as a client for panning platform 109 and perform one or more functions associated with the functions of the panning platform 109. In addition, the sensors 105 may be any type of sensor. In one embodiment, the sensors 105 may include one or more sensors that may assist the panning platform 109 to determine POI information to be used with streets associated with UE 101. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one embodiment, a device user may pan maps by simply tilting the UE 101 towards desired direction, the changes in the height and the angles at which the device is held may be sensed by sensors 105. The sensors 105 may provide the tilt angle information depending on UE 101's inclination relative to the earth gravity, to the panning platform 109 to cause a generation of a panning for a route. Henceforth, making map panning possible through sensors' input, wherein the device user may navigate using only one hand.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the panning platform 109 may include or have access to a geographic database 111 to access or store any kind of data associated with POI, such as historical user information, location proximity information, temporal proximity information, contextual proximity information, etc. Data stored in the geographic database 111 may, for instance, be provided by the UEs 101, a service platform 113, one or more services 115a-115n (or services 115), or one or more content providers 117a-117n (or content providers 117).

As noted previously, the textual or pictorial representation of street information acts as visual guidance to the user when he is looking around his real life environment to spot the streets. In this example, if user needs to go to XYZ located in 123 street, the system 100 renders a presentation of a route for streets in association with the user interaction and/or user gesture with the interface of the navigation service of UE 101 coupled with the content information of UE 101. In many situations, it is easier for the user to quickly identify the streets by looking at the mapping device with the navigation information displayed for the street. This ease of identification is particularly helpful when the user is driving.

In one embodiment, the panning platform 109 may be a platform with multiple interconnected components. The panning platform 109 may include multiple servers, intelligent networking devices, computing devices, components and corresponding software for performing the function of navigating the user of UE 101 towards POI that is determined upon the processing of the received user interaction with the UE 101 coupled with the content information of UE 101, for instance, by providing a visual representation of a route for the determined street in a mapping device as visual guidance information to the users. In addition, it is noted that the panning platform 109 may be a separate entity of the system 100, a part of the one or more services 115 of the service platform 113, or included within the UE 101 (e.g., as part of the application 103). The panning platform 109 may store a set of inherent set rules for restricting the panning to a desired route. For the purpose of illustration, the map representation depicts a perspective of the point of information, wherein the street serves as the focal point for perceiving and/or depicting the route information. The map, as displayed via the user interface element, may include one or more location anchors that are presented along the determined route. As such, the map may be panned left, right, up and/or down by the user by swiping on the user interface for enabling a better view (preview) of the street. In addition, the user interface element may be manipulated by the user via the display of UE 101 to permit an expanded view of the street.

By way of example, the user interface element may be displayed as a map that depicts a route with location anchor embedded therein which corresponds to the street. Alternatively, the map may be presented, wherein a portion of the display features the data provided by the mapping application 103, geographic database 111 and/or service 115. In one embodiment, the user interface element may represent an interactive portion of the user interface as presented to the display of the UE 101. Hence, the user may control the user interface element via one or more touch screen inputs or other input means, including controlling a degree of rotation (e.g., panning) of the route or enabling an expanding of the route for the street. Of note, the panning platform 109 is configured to process various inputs for facilitating control of the user interface element via operation of the application 103, geographic database 111 and/or services 115.

In another embodiment, the panning platform 109 enables the user to pan the map at any degree of rotation. As such, the user is able to view a map of the location from any perspective. For example, as the map is panned left or right about a center point corresponding to the selected route, the map also rotates accordingly. Moreover, when the user manipulates the user interface element to permit a greater amount of map image to be viewed (e.g., enhanced width) the texts and location anchors may also be expanded to represent an increased view sector.

In one embodiment, restricting panning to a desired route is retrieved by the panning platform 109 by way of application 103 and/or geographic database 111 and/or services 115. For example, the map images may depict routes for various location anchors corresponding to the street, including for example, buildings, landmarks, streets, intersections and the like. Hence, the map image presented via the user interface element directly correlates to the determined or specified street of the user. The panning platform 109 may cause retrieval of the map images in connection with the service 115, which may further execute the query based on data collected by the sensors 105 of the UE 101.

By way of example, the user may select a specific street to view based on user interaction. This may include a touch screen input selection as rendered to the two dimensional map of the location. Based on this input, the panning platform 109 causes the route to be highlighted within the map along with the presentment of various indicators. In certain embodiments, the selection indicators are juxtaposed against the map presented by UE 101. Hence, in the case of streets, the selection indicators are featured along the location anchors of the determined route.

In certain embodiments, the user may provide further input for interacting with the panning platform 109. For example, the user may drag or flick their finger across the user interface element to traverse through the map. Alternatively, the panning platform may automatically show location anchors for a couple of seconds and then move on to the next available location anchor based on user interaction and/or user gesture, such as, a touch, swipe etc. Under this scenario, the route represented in a map stays in the center of the screen and may be shown in connection with the highlighted representation of the location anchors along the map. In addition, the location anchors may also be displayed in connection with various tags for easy identification (e.g., the name and description). Further, multiple finger gestures could be used as a quick access to the beginning or end of the browsed route.

By way of example, the panning platform 109 enables one or more of the following: (1) process an input for specifying a panning of a map to associate with POI via an interactive user interface element; (2) determine streets to associate with the at least one route based, at least in part, on the user interaction and/or user gesture with the UE 101 and/or content information; (3) cause, at least in part, a rendering of a map image via the interactive user interface element for depicting the streets based, at least in part, on the input; (4) enable selection of various location anchors alongside the determined route; (5) enable rotation panning of the map relative to a selected street or expansion of the interactive user interface element for expanding the view of the determined route that navigates to the street, etc.

In one embodiment, a user may want to visit POI (e.g., XYZ shop), the user activates the map application in his UE 101. The UE 101 may send a request to the panning platform 109 for presentation of a map, navigating the user towards the POI. The panning platform 109 communicates with the geographic database 111, the services platform 113 and the content provider 117 for relevant street information. The panning platform 109 then processes the user interaction and/or user gestures with the UE 101 to determine a possible route associated with the POI. Upon determination, the panning platform 109 may initiate one or more applications for presenting the map, wherein the determined route is shown in the middle of the screen. Such route can change along with the user interaction with the UE 101.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the panning platform 109 and the content providers 117 to supplement or aid in the processing of the content information. In other embodiments, the services platform 113, the services 115, the applications 103, etc. may be used to allow the users of UE 101 to restrict the panning to the desired route.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the panning platform 109 with travel information of the one or more geo-routes and/or location anchors, etc.

The content providers 117 may provide content to the UE 101, the panning platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in the processing of the content information associated with POI to determine a route for map panning purposes. In one embodiment, the content providers 117 may also store content associated with the UE 101, the panning platform 109, and the services 115 of the services platform 113. In another embodiment, the content providers 117 may manage access to a central repository of data, and offer a consistent, standard interface to data, such as a repository of users' navigational data content.

By way of example, the UE 101, the panning platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
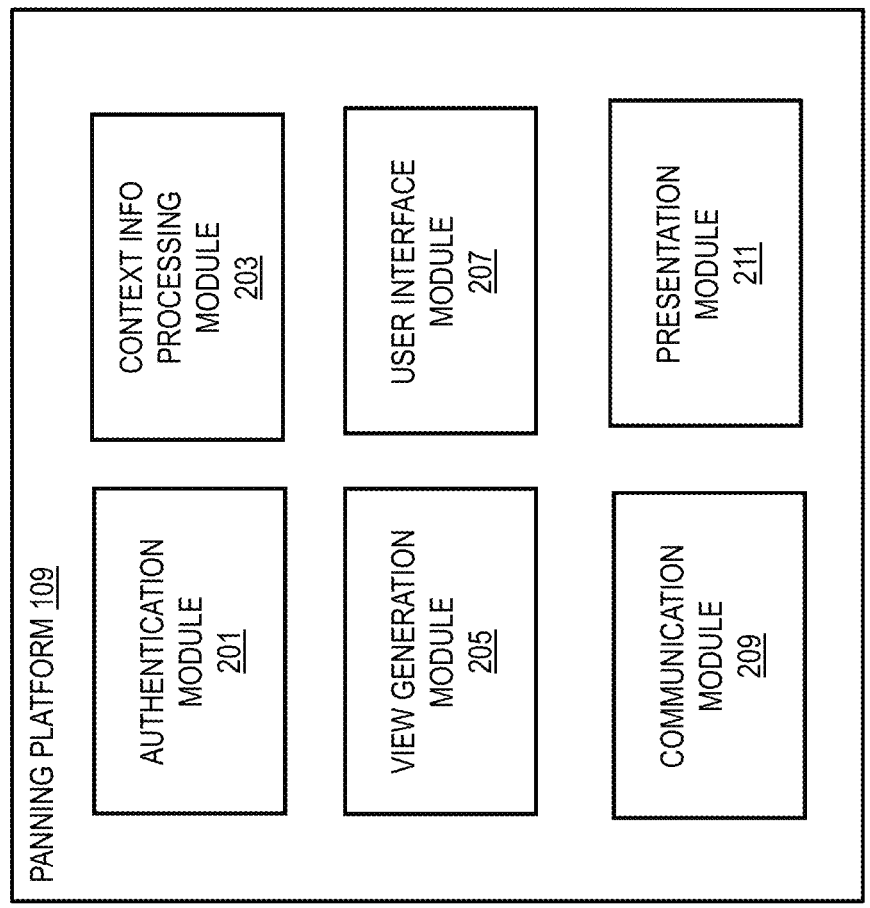
FIG. 2 is a diagram of the components of a panning platform 109, according to one embodiment.

FIG. 2 is a diagram of the components of a panning platform, according to one embodiment. By way of example, the panning platform 109 includes one or more components for causing a restriction to the panning of the selected route, according to one embodiment. It is contemplated that the functions of these components may be combined in one or more components or performed by other components of equivalent functionality. In this embodiment, the panning platform 109 includes an authentication module 201, context information processing module 203, view generation module 205, user interface module 207, communication module 209 and presentation module 211.

In one embodiment, an authentication module 201 authenticates users and UE 101 for interaction with the panning platform 109. By way of example, the authentication module 201 receives a request to subscribe to the panning platform 109 for enabling generation of route images in connection with a selected street. The subscription process may include, for example, establishing one or more services the user is affiliated with as well as their respective access credential information. Subscription may also entail selection of an "opt-in" option, wherein users of the panning platform 109 permits sharing of their context information (e.g., location information, position information and temporal information) as collected via one or more sensors 105 of UE 101 and/or geographic database 111 and/or services 115. Preferences and settings information may be referenced to a specific user, user device, or combination thereof and maintained in the geographic database 111. It is further noted, in certain embodiments, that the subscription process may be coordinated with a subscription process of a given services 115 accessed by a user.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the panning platform 109 (e.g., as enabled by user interface module 207). Profile data pursuant to registration may be cross referenced as part of the login process. Alternatively, the login process may be performed through automated association of profile settings maintained with an IP address, a carrier detection signal of a user device, mobile directory number (MDN), subscriber identity module (SIM) (e.g., of a SIM card), radio frequency identifier (RFID) tag or other identifier.

The authentication module 201 may also be alerted of an input received via the user interface for indicating a user requested action. For example, the request may be a type of touch input, such as, a swipe towards left of the screen indicates panning towards the left of a user interface element as generated via the user interface module 207. As another example, the touch input may be a selection of a specific location for viewing of a specific street related image. It is noted that the user interface module 207 supports presentment of the user interface element for presenting such images while the authentication module 201 interprets input provided to the user as they engage the panning platform 109. The authentication module 201 is therefore configured to receive requests for generation of a map image via the service or application.

In one embodiment, the context information processing module 203 receives context information as gathered by the sensors 105 of respective UE 101 and/or geographic database 111 and/or services 115. Once received, the context information processing module 203 analyzes the context information to determine the relative location, time, position and other information useful for generating a map in association with a specified location. Based on this determination, the context information processing module 203 triggers execution of the view generation module 205, which facilitates the querying/retrieval associated map image data from geographic database 111 corresponding to the location.

In one embodiment, the view generation module 205 facilitates gathering of the various map images corresponding to a location selected via a mapping application or service. In addition, the view generation module 205 determines and/or retrieves the various map images corresponding to a specified street. It is noted, in certain embodiments, that the view generation module 205 may facilitate various image rendering, blending, merging and other compilation techniques for producing a user friendly map image.

In one embodiment the user interface module 207 enables presentment of a graphical user interface for presenting map images in connection with a selected street. By way of example, the user interface module 207 generates the user interface element in response to detection of an input for selection of street in a map. As another example, the user interface module 207 enables highlighting of a specific route related to the street presented via the user interface. Of note, the user interface module triggers execution of the various other modules, including the authentication module 201, and view generation module 205 in response to user input.

The user interface module 207 employs various application programming interfaces (APIs) or other function calls corresponding to the application 103 of UE 101; thus enabling the display of graphics primitives such as menus, buttons, data entry fields, etc., for generating the user interface elements. Still further, the user interface module 207 may be configured to operate in connection with augmented reality (AR) processing techniques, wherein various different applications, graphic elements and features may interact within the POI at the UE 101. For example, the user interface module 207 may coordinate the presentment of augmented reality map images in conjunction with various images for a given location or in response to a selected street.

In one embodiment, a communication module 209 enables formation of a session over a communication network 107 between the panning platform 109 and the services 115. By way of example, the communication module 209 executes various protocols and data sharing techniques for enabling collaborative execution between a subscriber's UE 101 and the panning platform 109 over the communication network 107.

The presentation module 211 makes a presentation of the map with determined routes highlighted therein for POI upon receiving the data from communication module 209. The presentation module 211 may utilize the geographic database and/or services 115 to determine whether the information for POI is up to date. This module obtains a set of summary statistics from other modules. Then, the module continues with generating a presentation corresponding to the POI. Then, continues with providing of presentation data set where the presentation could be depicted in one or more visual display units.

The above presented modules and components of the panning platform 109 can be implemented in hardware, firmware, software, or a combination thereof. Though depicted as a separate entity in FIG. 1, it is contemplated that the panning platform 109 may be implemented for direct operation by respective UE 101. As such, the panning platform 109 may generate direct signal inputs by way of the operating system of the UE 101 for interacting with the application 103. In another embodiment, one or more of the modules 201-211 may be implemented for operation by respective UEs, as a panning platform 109, or combination thereof. Still further, the panning platform 109 may be integrated for direct operation with services 115, such as in the form of a widget or applet, in accordance with an information and/or subscriber sharing arrangement. The various executions presented herein contemplate any and all arrangements and models.

Figure 3:
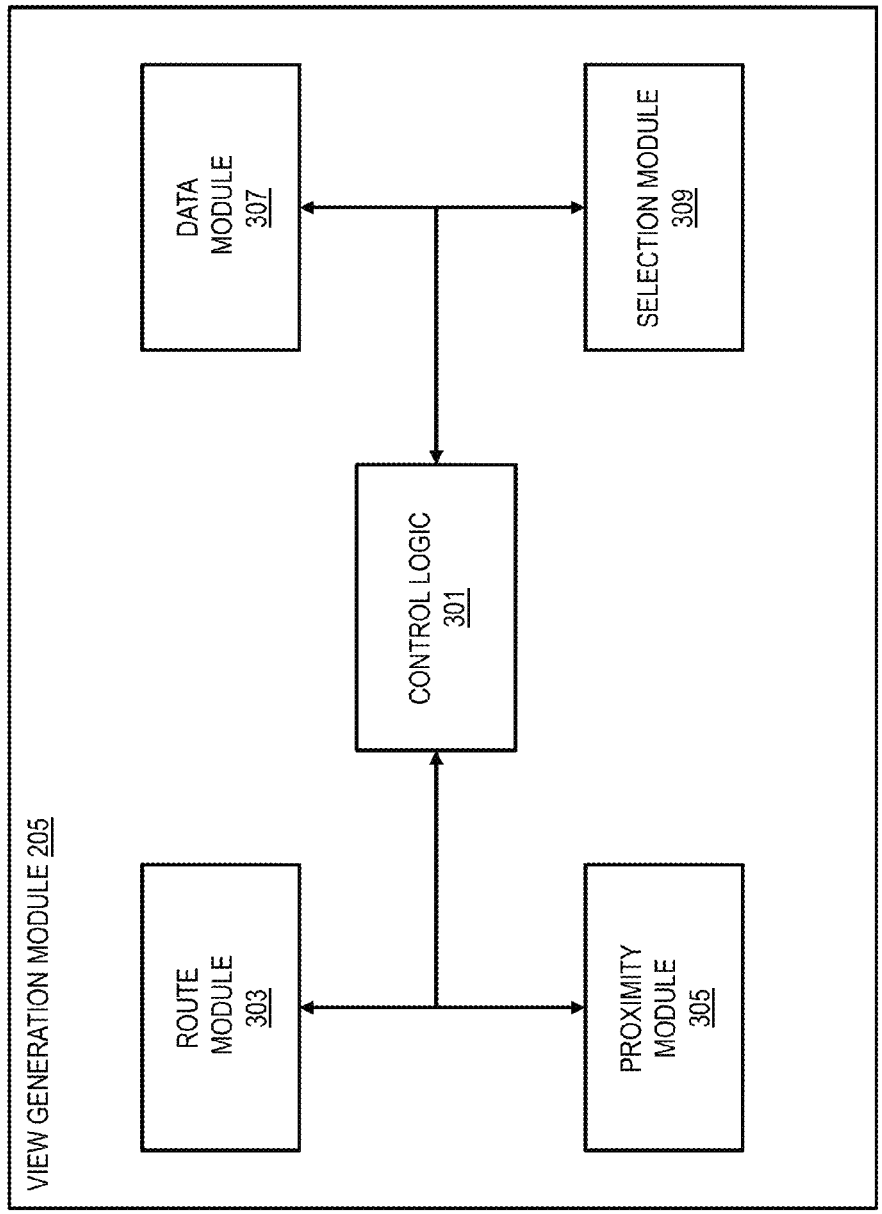
FIG. 3 is a diagram of the components of the view generation module 205, according to one embodiment.

FIG. 3 is a diagram of the components of the view generation module 205, according to one embodiment. By way of example, the view generation module 205 includes one or more components for providing efficient map panning using street anchored browsing. It is contemplated that the functions of these components may be combined in one or more components or performed by other components of equivalent functionality. In this embodiment, the view generation module 205 includes a control logic 301, route module 303, proximity module 305, data module 307, and selection module 309.

The control logic 301 executes at least one algorithm for executing functions at the presentation module 211. For example, the control logic 301 may interact with the route module 303 to receive one or more geo-routes, one or more location anchors, or a combination thereof associated with one or more UEs 101. In one embodiment, the route module 303 may determine one or more geo-routes, one or more location anchors, or a combination thereof using historical and/or predicted user information, such as the daily work commute traveled by one or more UEs 101. With the one or more geo-routes and/or one or more location anchors, the control logic 301 and the proximity module 305 may determine proximity information of one or more UEs 101 to the one or more POI. The control logic 301 and the proximity module 305 may determine proximity information that includes, at least in part, location, temporal, contextual proximity information, or a combination thereof.

The control logic 301 and data module 307 may define POI information, while the selection module 309 may select the determined streets based, at least in part, on the proximity information determined by the proximity module 305. For instance, the selected streets with one or more geo-routes and/or one or more location anchors within a certain proximity threshold of one or more UEs 101 may be chosen out of all the other streets. Alternately, the control logic 301 and selection module 309 may sort the one or more streets based on proximity information. For example in one scenario, the control logic 301 and selection module 309 may determine to select the top ten streets that are geographically closest to a UE 101.

In one embodiment, the selection module 309 may select the one or more streets based, at least in part, on the location information. For instance, one or more POI information may be selected because the history of geo-routes indicates that they will soon be proximate location (e.g., regardless of whether the UEs 101 are already in the location, as the predicted user information suggests that UEs 101 may soon be within the vicinity). Further, the selection module 309 may determine one or more predicted locations of a user based, at least in part, on the ease of access from a location associated with the UEs 101.

Further the selection module 309 may interact with other modules of panning platform 109 to direct the one or more UEs 101 to the chosen streets. For example, the control logic 301 and application 103 may work together to determine navigation guidance information to cause, at least in part, a presentation of the one or more POI. In one scenario, this may include UEs 101 displaying directions on how to reach POI.

Figure 4:
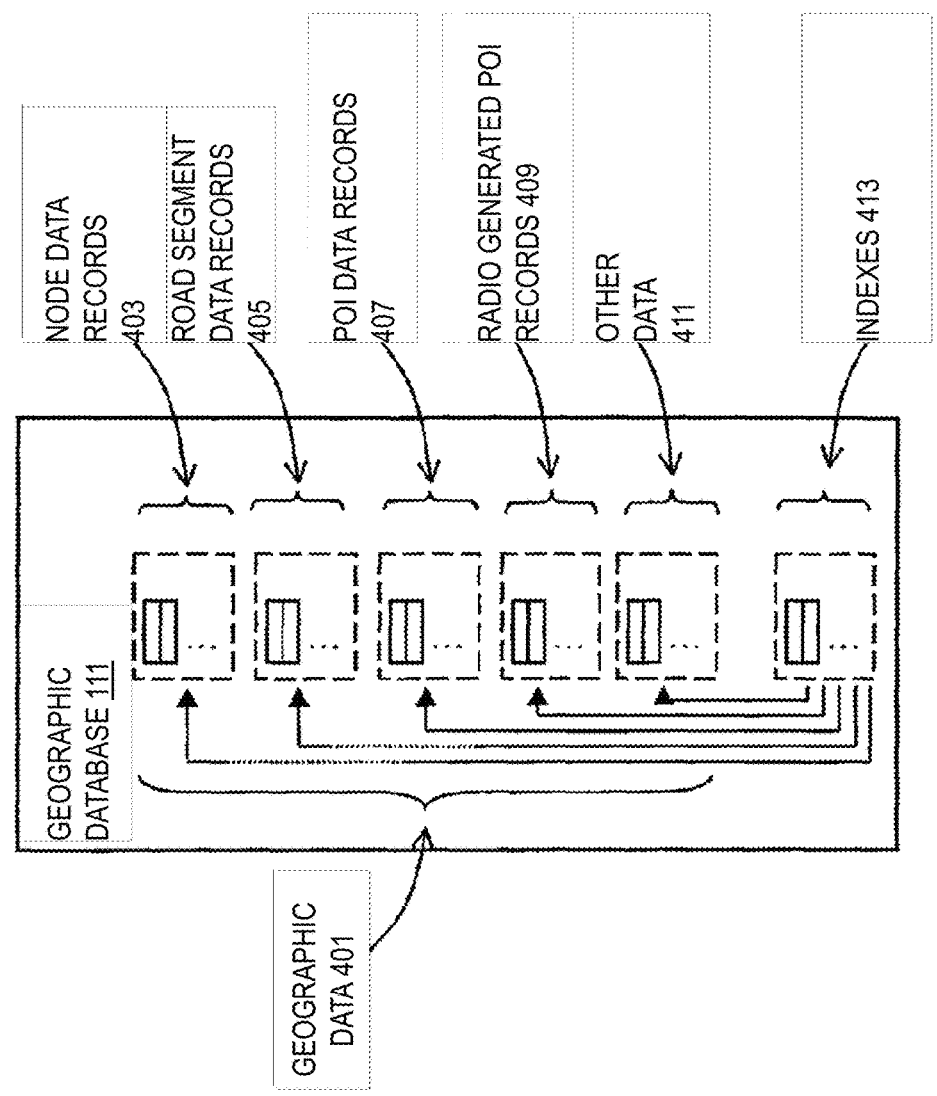
FIG. 4 is a diagram of geographic database 111 of system 100, according to exemplary embodiments.

FIG. 4 is a diagram of geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 401 used for (or configured to be compiled to be used for) mapping and/or navigation-related services, such as for personalized route determination, according to exemplary embodiments. For example, the geographic database 111 includes node data records 403, road segment or link data records 405, POI data records 407, radio generated POI records 409, and other data records 411, for example. More, fewer or different data records can be provided. In one embodiment, the other data records 411 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 405 are links or segments representing roads, streets, or paths, as can be used in the calculated route or recorded route information for determination of one or more personalized routes, according to exemplary embodiments. The node data records 403 are end points corresponding to the respective links or segments of the road segment data records 405. The road link data records 405 and the node data records 403 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 407. The geographic database 111 can also include data about places, such as cities, towns, or other communities, and other geographic features, such as bodies of water, mountain ranges, etc. Such place or feature data can be part of the POI data records 407 or can be associated with POIs or POI data records 407 (such as a data point used for displaying or representing a position of a city). In addition, the geographic database 111 can include data from radio advertisements associated with the POI data records 407 and their respective locations in the radio generated POI records 409. By way of example, a street is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 5:
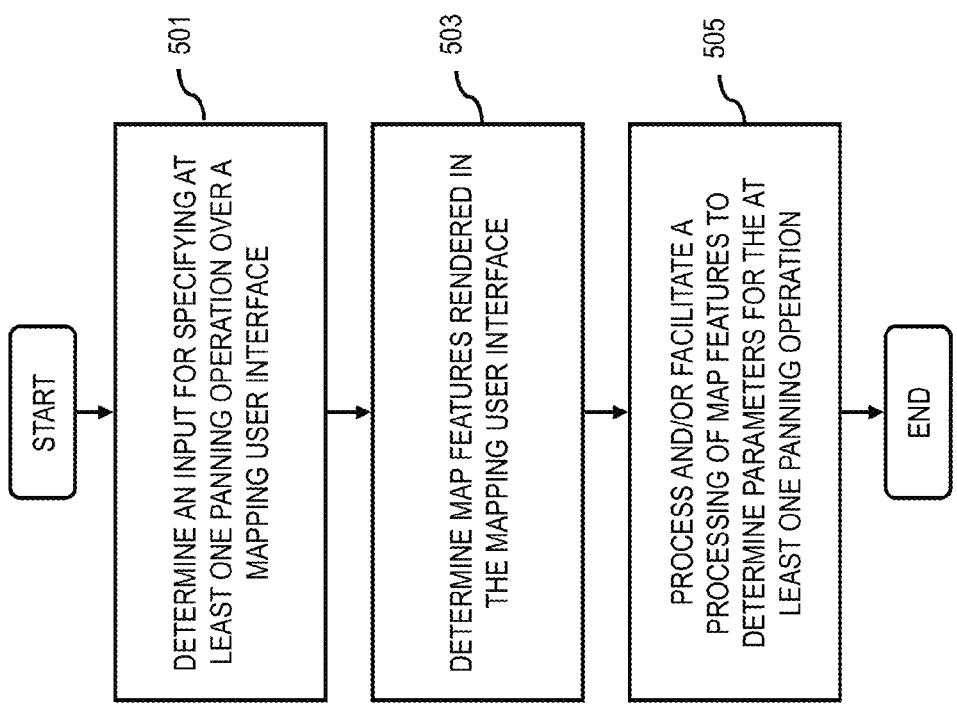
FIG. 5 is a flowchart of a process for determining an input for specifying a panning operation and map features in a mapping user interface, according to one embodiment.
Figure 14:
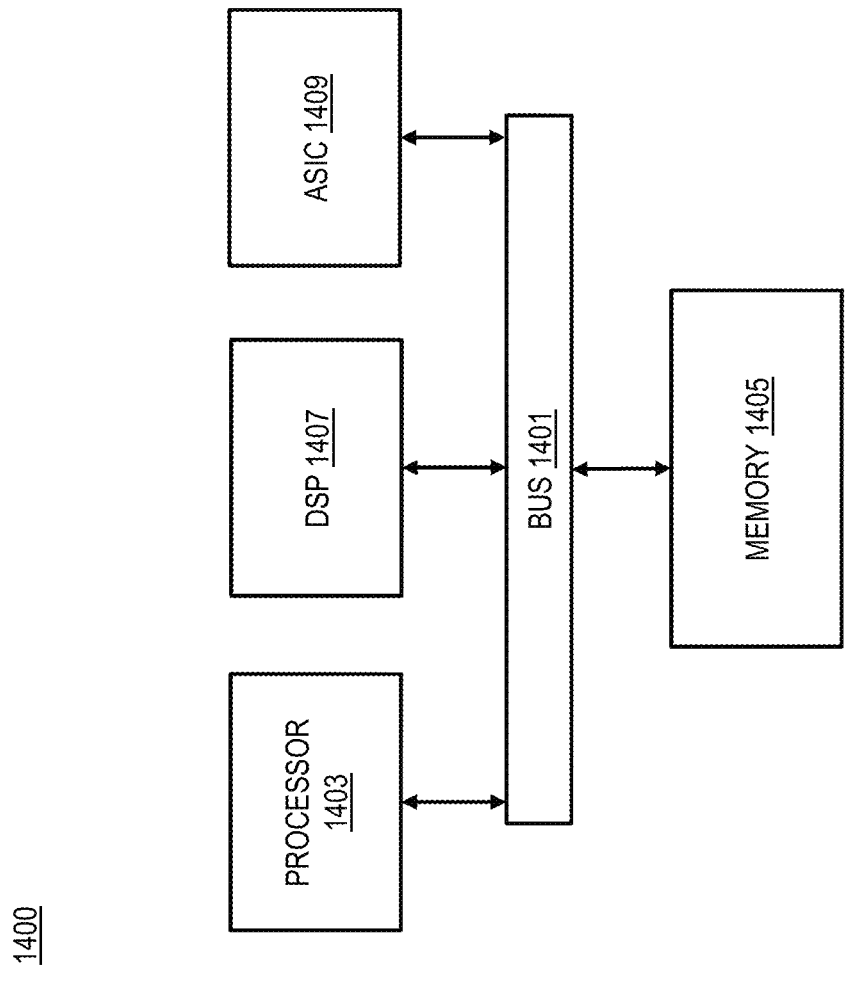
FIG. 14 is a diagram of a chip set that can be used to implement an embodiment of the invention.

FIG. 5 is a flowchart of a process for determining an input for specifying a panning operation and map features in a mapping user interface, according to one embodiment. In one embodiment, the panning platform 109 performs processes 500 and is implemented in, for instance, a chip set including a processor and a memory as shown in FIG. 14.

In step 501, the panning platform 109 determines an input for specifying at least one panning operation over a mapping user interface. As noted previously, any location based service may employ the various executions provided via the panning platform 109. Furthermore, the user interface element includes, at least in part, at least one representation of the street. Per step 501, the panning platform 109 determines an input that depict one or more routes based, at least in part, on the user interactions and/or user gestures with UE 101 and the content information of UE 101. As noted previously, the route may include a specific land mark, location anchors, which may be featured and/or depicted via a map image. In one embodiment, the panning platform 109 identifies and provides the user with multiple services for enhancing user experience, the panning platform 109 may, for instance, look for ways to present the navigation which may be more relevant to user of UE 101.

In step 503, the panning platform 109 determines one or more map features rendered in the mapping user interface. The map presentation may feature various objects depicting streets, roads, buildings, location anchors and other representations of elements corresponding to POI. By way of touch based input, the user clicks on a specific location on the interface. In response, the panning platform 109 renders a user interface element for presenting a map image for the street. The map image features various indicators associated with the selected street including one or more location anchors, routes, buildings, a street view, etc. Having selected a street and rendered a corresponding user interface element for viewing the street, the user may select a specific route featured in the map to view the street. In one scenario, the user provides an extended touch input to the interface for selecting a street featured within the map image. Resultantly, the map presentation comprises of a highlighted route leading to the street. In addition, all available location anchors, route indicators for the street is shown.

In step 505, the panning platform 109 processes and/or facilitates a processing of the one or more map features to determine one or more parameters for the at least one panning operation, wherein the one or more parameters include, at least in part, a panning direction parameter, a screen centering parameter, or a combination thereof. The panning platform 109 may process one or more interactions and/or gesture with the user interface element to determine one or more parameters for specifying the street. This may include, for example, input entered via the user for indicating an extent of panning of routes for street, such as, user swiping two fingers may be processed to generate the extent of panning of routes for the street. Per user input, the panning direction parameter causes an updating of the map presentation, such as the user interface element representing the route, the location anchors etc. Further, the screen centering parameter may present a portion of the at least one route image in the center of the screen of UE 101.

Figure 6:
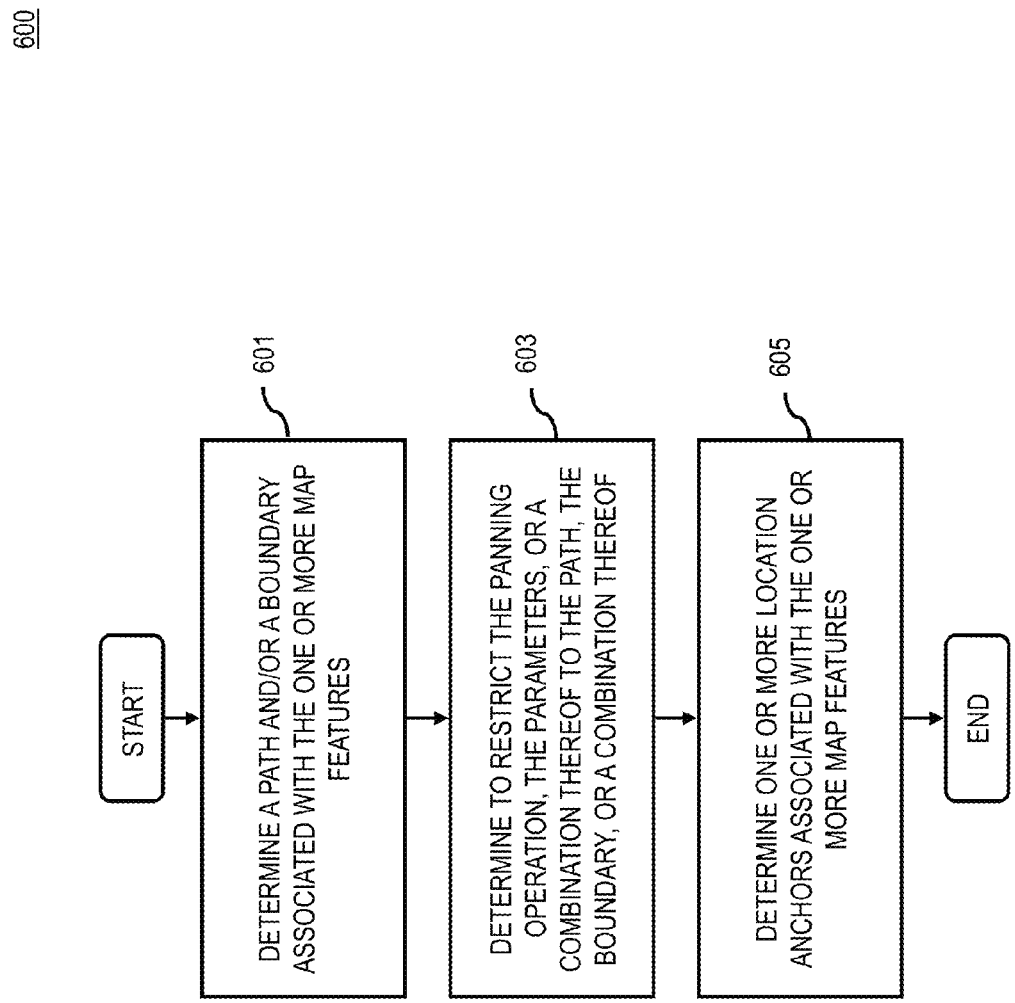
FIG. 6 is a flowchart of a process for determining a path and/or a boundary and then determining to restrict the panning operation and/or the one or more parameters to the path and/or the boundary, according to one embodiment.

FIG. 6 is a flowchart of a process for determining a path and/or a boundary and then determining to restrict the panning operation and/or the one or more parameters to the path and/or the boundary, according to one embodiment. In one embodiment, the panning platform 109 performs processes 600 and is implemented in, for instance, a chip set including a processor and a memory as shown in FIG. 14.

In step 601, the panning platform 109 determines a path, a boundary, or a combination thereof associated with the one or more map features. Per step 601, the panning platform 109 determines to select the one or more path and/or boundary based on the one or more routes that is associated with user interaction with UE 101. For example, the panning platform enables the viewing of those path and/or boundaries that can be witnessed by the user for the determined street.

In step 603, the panning platform 109 determines to restrict the at least one panning operation, the one or more parameters, or a combination thereof to the path, the boundary, or a combination thereof, wherein one or more map features include, at least in part, a street, a transport line, a terrain feature, or a combination thereof. For the purpose of illustration, the user is presented with mapping information via a mapping application and/or service. The interface features various objects depicting routes, streets, roads and other representations of elements corresponding to a map. By way of touch based input, the user clicks on a specific location on the interface. In response, the panning platform 109 renders a presentation wherein the panning operation is caused to restrict the presentation of the routes, location anchors, streets, roads corresponding to the selected street. The panning platform 109 may provide browsing along rivers, parks, indoors (e.g. Shopping mall) etc. associated with the determined POI.

In step 605, the panning platform 109 determines one or more location anchors associated with the one or more map features, wherein the at least one panning operation includes, at least in part, a recentering of the mapping user interface based, at least in part, on the one or more location anchors. Further, the one or more location anchors include, at least in part, one or more streets. In one embodiment, the panning platform 109 renders a presentation based, at least in part, on the touch based input received from the user of UE 101. Such presentation may include location anchors in connection with the determined street, depicting the direction and route for the determined streets. The location anchor is represented, by way of example, may also correspond to a current position/orientation of the user, i.e., a direction the user is facing, in instances where the map is associated with a real-time location tracking service. Resultantly, the location anchor corresponding to the newly determined street is shown in the center of the user interface of UE 101.

Figure 7:
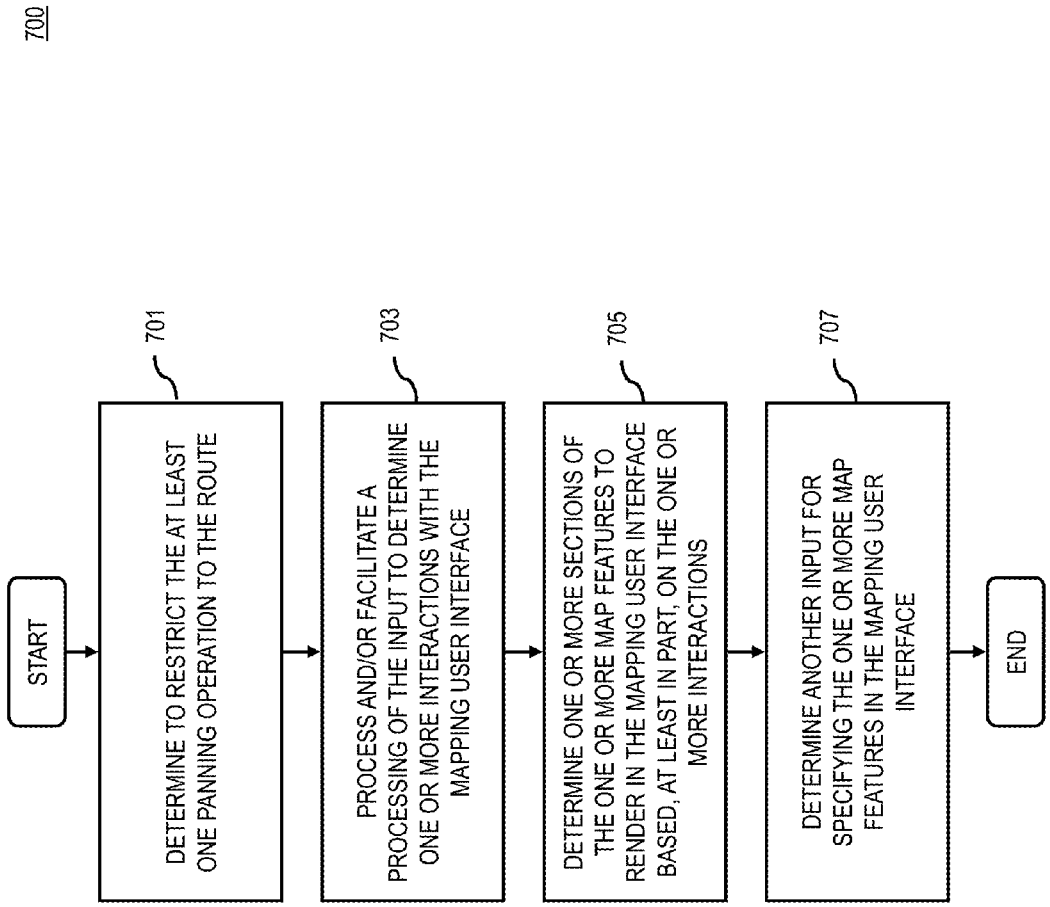
FIG. 7 is a flowchart of a process for causing a determination to restrict a panning operation to the route and then determine one or more sections of the map features to render in the mapping user interface based, at least in part, on the determined user interactions, according to one embodiment.

FIG. 7 is a flowchart of a process for causing a determination to restrict a panning operation to the route and then determine one or more sections of the map features to render in the mapping user interface based, at least in part, on the determined user interactions, according to one embodiment. In one embodiment, the panning platform 109 performs processes 700 and is implemented in, for instance, a chip set including a processor and a memory as shown in FIG. 14.

In step 701, the panning platform 109 determines to restrict the at least one panning operation to the route. For example, user of UE 101 may save time in navigating around a large space which could require dragging their finger repeatedly across the surface of a touch screen because they can use the panning control to move across an entire space with a single finger input. Further, the user may be provided with a contextual indication that shows them where they are currently located within the larger space. The panning platform 109 may restrict a route determined upon the processing of the user interaction and the content information of UE 101. In one embodiment, the panning platform 109 makes the identification of a street easier by representing location anchors alongside the determined route associated with the street. In this way, the panning platform 109 can present the map image in association with the street to enable a user to look for or identify the street in the map and reach the destination by following the panned route for the determined street. In this way, a navigation service may present the user with such map representation of the street as visual guidance when displaying mapping and/or navigation information. This ease of identification is particularly helpful when the user is driving, where the speed of the vehicle makes identifying text-based identifiers more difficult when compared to map/image-based identification.

In step 703, the panning platform 109 processes and/or facilitates a processing of the input to determine one or more interactions with the mapping user interface. In one scenario, the user may swipe his finger on the screen of UE 101 looking for a street, such input may send a request to the panning platform 109 for map representation of route information to the street. In another scenario, the user may use multiple finger gesture which may be processed by the panning platform to denote that the user is requesting for a quick access to the beginning or end of the browsed route. Further, the panning platform may have its own set of rules to identify touch based interaction and/or gesture based interaction. The panning platform 109 may process and/or facilitate a processing of user input to determine interaction with the mapping user interface, for instance, multiple finger swipes in the opposite direction by a user may imply that the user is trying to expand a view for the street etc.

In step 705, the panning platform 109 determines one or more sections of the one or more map features to render in the mapping user interface based, at least in part, on the one or more interactions, wherein the one or more interactions include, at least in part, a touch-based interaction, a gesture-based interaction, or a combination thereof. In particular, when a user indicates an intent to pan, such as by touch-based interaction and/or a gesture-based interaction, the panning platform 109 processes the user interaction to present a user friendly graphical control element that permits accelerated panning in the map for searching streets. In one scenario, user may select to be presented with a street view in an area around the POI. Where there are multiple images, the panning platform 109 determines sections of the map features to be presented in the mapping user interface and they can be made to appear seamless to a user by serving them in succession and blending them at their edges. In this manner, the user can be provided with the effect of viewing on their mobile device the area around the street.

In step 707, the panning platform 109 determines another input for specifying the one or more map features in the mapping user interface. In one embodiment, user of UE 101 may try to pan a map for a complicated route, route having diagonal directions or irregular shapes are usually difficult to pan on a mobile device hence the user might get confused and waste time trying to figure out such route. Therefore, the panning platform 109 locks browsing to such determined route, making it possible for users to pan in an efficient way when the geometry of the selected route is complex.

Figure 8:
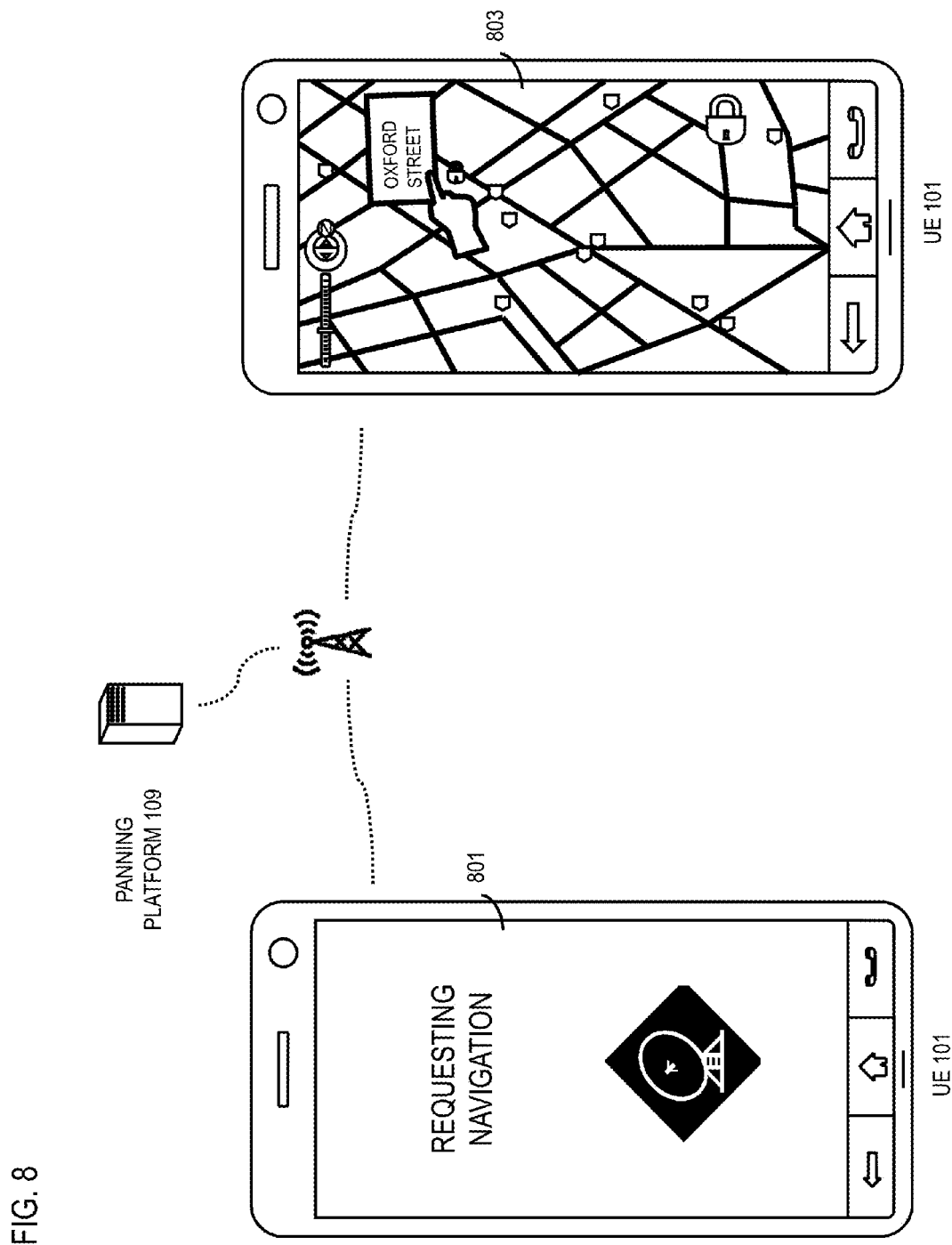
FIG. 8 is a diagram of user interface utilized in the processes of FIGS. 5-7, according to various embodiments.

FIG. 8 is a diagram of user interfaces utilized in the processes of FIGS. 5-7, according to various embodiments. For the purpose of illustration, the diagrams are described with respect to an exemplary use case of a user interacting with the panning platform 109 via a mobile device. In this example, the user is presented with various map images, via a user interface element, in response to a request for finding a route for determined streets via a mapping application interface. In one scenario, the UE 101 sends a request for navigation for POI to the panning platform 109. The user is presented (to display 803) with mapping information via a mapping application and/or service. The interface features various objects depicting routes, location anchors, streets, roads, buildings and other representations of elements corresponding to POI. By way of touch based input, the user clicks on a specific location on the interface. In response, panning platform 109 renders a presentation corresponding to the selected street. Further, the map image features anchor icon to highlight that the browsing will now occur on the selected street to ease the navigation in that particular street associated with the selected POI, including one or more location anchors, buildings, a street view, etc. In addition, the display may also correspond to a current position/orientation of the user, i.e., a direction the user is facing, in instances where the map is associated with a real-time location tracking service.

Figure 9:
FIG. 9 is a diagram of user interface utilized in the processes of FIGS. 5-7, according to various embodiments.

FIG. 9 is a diagram of user interfaces utilized in the processes of FIGS. 5-7, according to various embodiments. As shown in figure, the map navigation can be restricted by the user by swiping on the user interface 901 in a given downward direction as it is presented via the user interface element 901. By way of example, when the user swipes their finger as shown in user interface 901 and gestures rightward, the map image is updated and pans towards right to reveal an updated map image from the available content information. In one embodiment, a user may not have a GPS in his UE 101 but is aware of the location he is in. The panning platform 109 may process the user interaction and/or user gesture to calculate a route from one street to the other, and may provide the user with route information for the street. The user may simply walk in the direction provided by the panning platform 109 to reach his destination. With this solution the user is able to pan along the route in an easy way. Further, the point on the route is always displayed in the center of the screen for user convenience.

Figure 10:
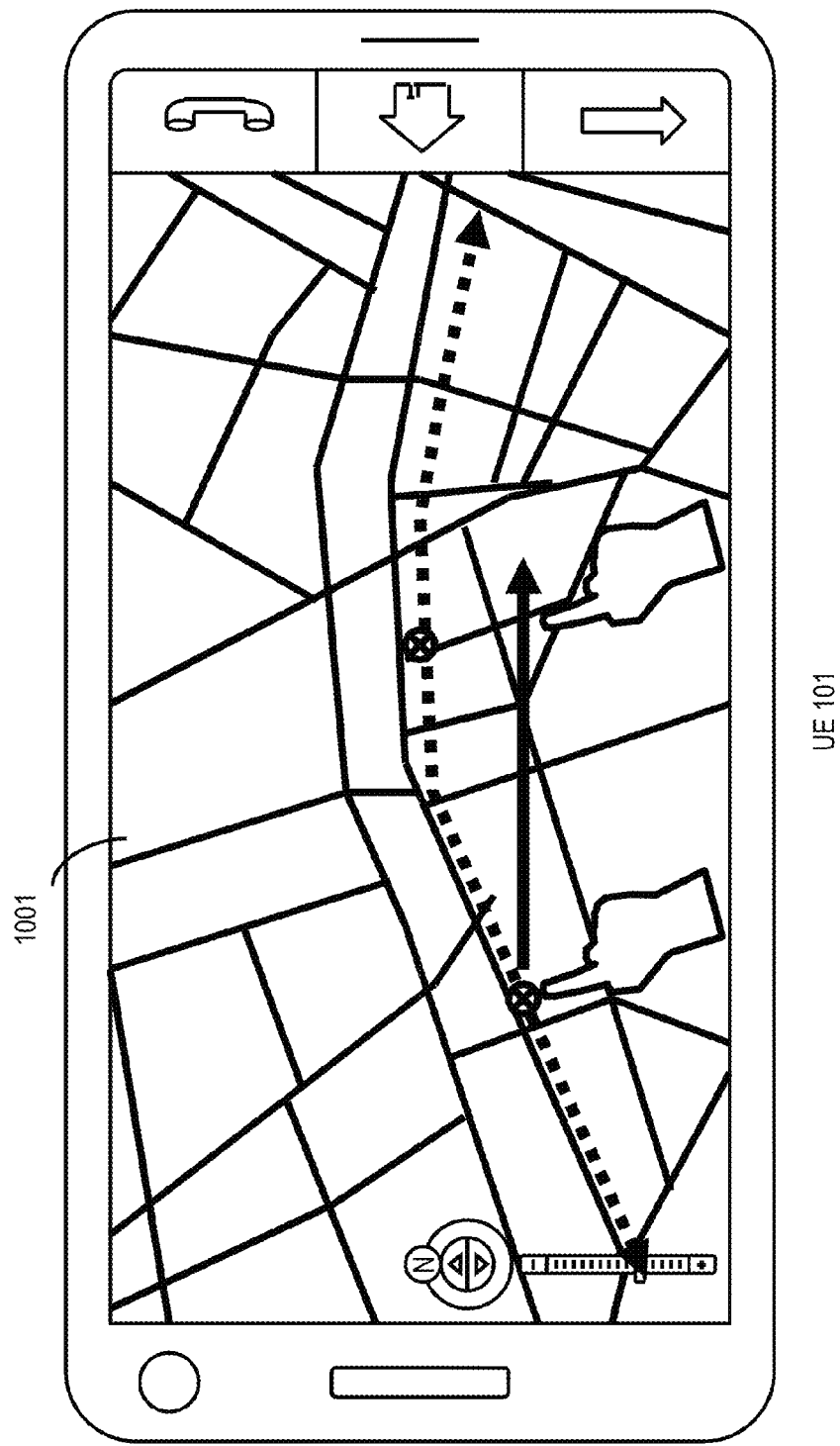
FIG. 10 is a diagram of user interface utilized in the processes of FIGS. 5-7, according to various embodiments.

FIG. 10 is a diagram of user interfaces utilized in the processes of FIGS. 5-7, according to various embodiments. In one embodiment, user may find it annoying to pan along the complex geometry of a route, therefore the panning platform 109 may offer a convenient way to browse such street, such as, by providing street number information or providing information on the length of the street etc. As shown in the user interface 1001, a user swipes his finger horizontally towards the right, the map image is updated in accordance with the user gesture and pans towards the right to reveal an updated map image from the available content information. As shown, the UE 101 displays the determined route in the center of the mobile screen, the route may be displayed with street number or any other relevant information, until the panning platform determines another route based on the user interaction and/or user gesture.

Figure 11:
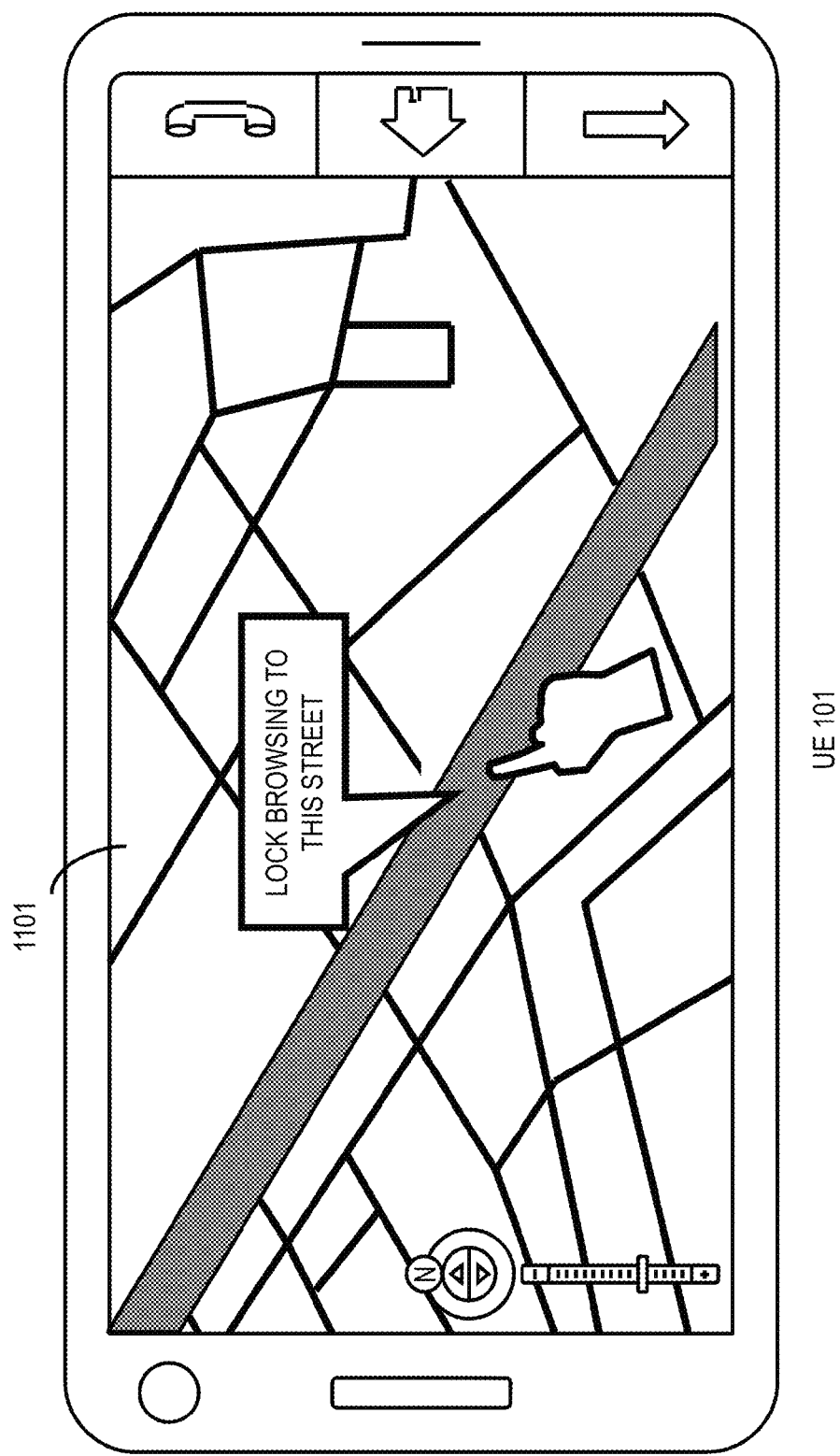
FIG. 11 is a diagram of user interface utilized in the processes of FIGS. 5-7, according to various embodiments.

FIG. 11 is a diagram of user interfaces utilized in the processes of FIGS. 5-7, according to various embodiments. In certain embodiments, panning of the route image as shown in user interface 1101 enables a user to more readily view and identify the streets in the area. Since, streets which have diagonal directions or irregular shapes are usually difficult to pan on a mobile communication device, the panning platform 109 locks browsing to the determined route or street selected by the user of UE 101. Having selected a route and being rendered a corresponding user interface 1101 for viewing the route image, the user may select a specific street featured in the route. Such attributes makes is possible for the user of UE 101 to pan a map on a mobile in an efficient manner.

Figure 12:
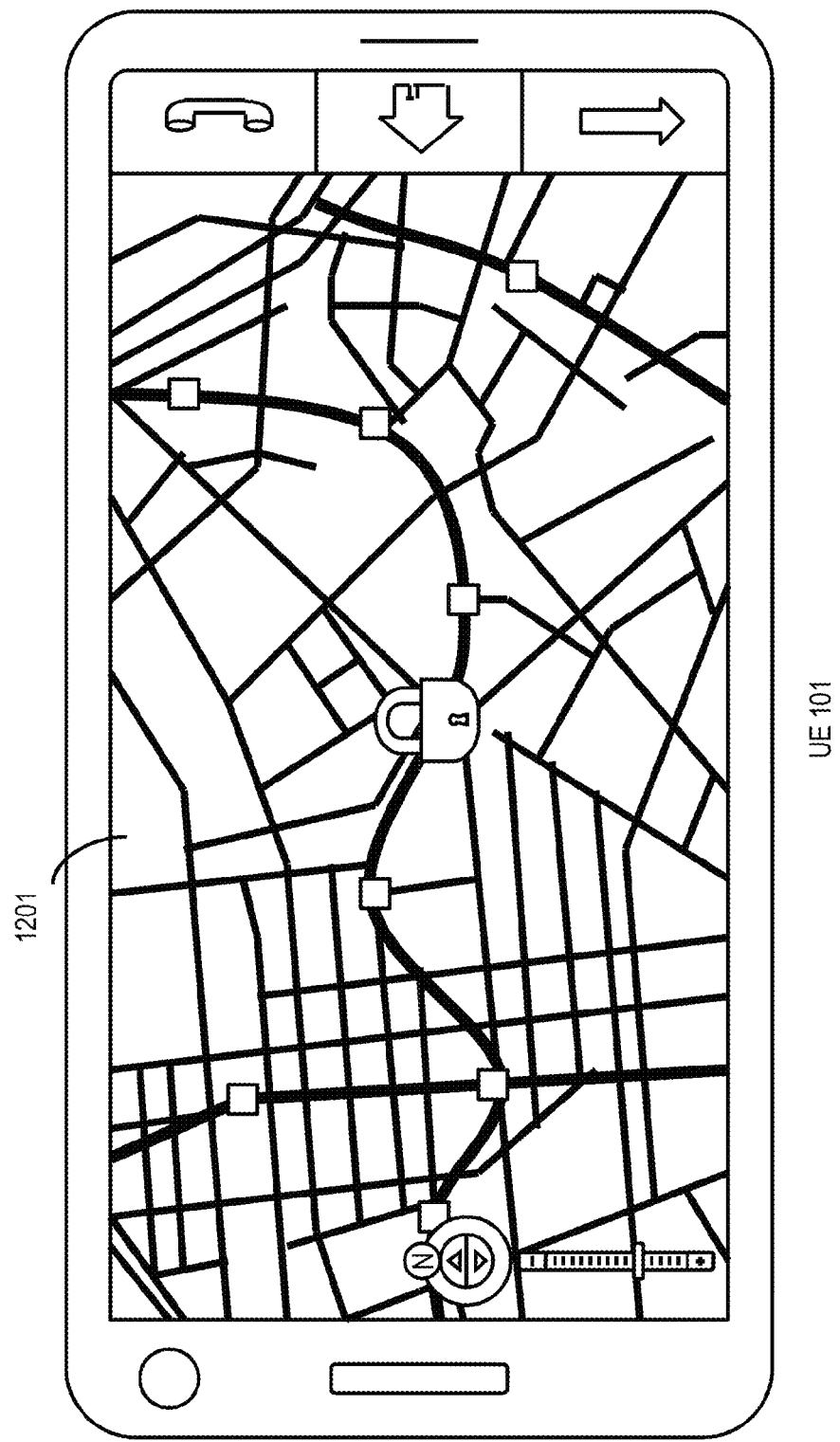
FIG. 12 is a diagram of user interface utilized in the processes of FIGS. 5-7, according to various embodiments.

FIG. 12 is a diagram of user interfaces utilized in the processes of FIGS. 5-7, according to various embodiments. In one embodiment, the figure displays the service rendered by panning platform 109 wherein a user may browse along rivers, parks, cities and may also include indoor navigation for larger spaces such as malls etc. Such concept may also be applied to public transport lines as they have geometry difficult to follow.

The processes described herein for processing one or more user interactions and/or user gestures with the user interface element to a cause panning for specifying routes with location anchors for a street, and a recentering of the mapping user interface based, at least in part, on the one or more location anchors, may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
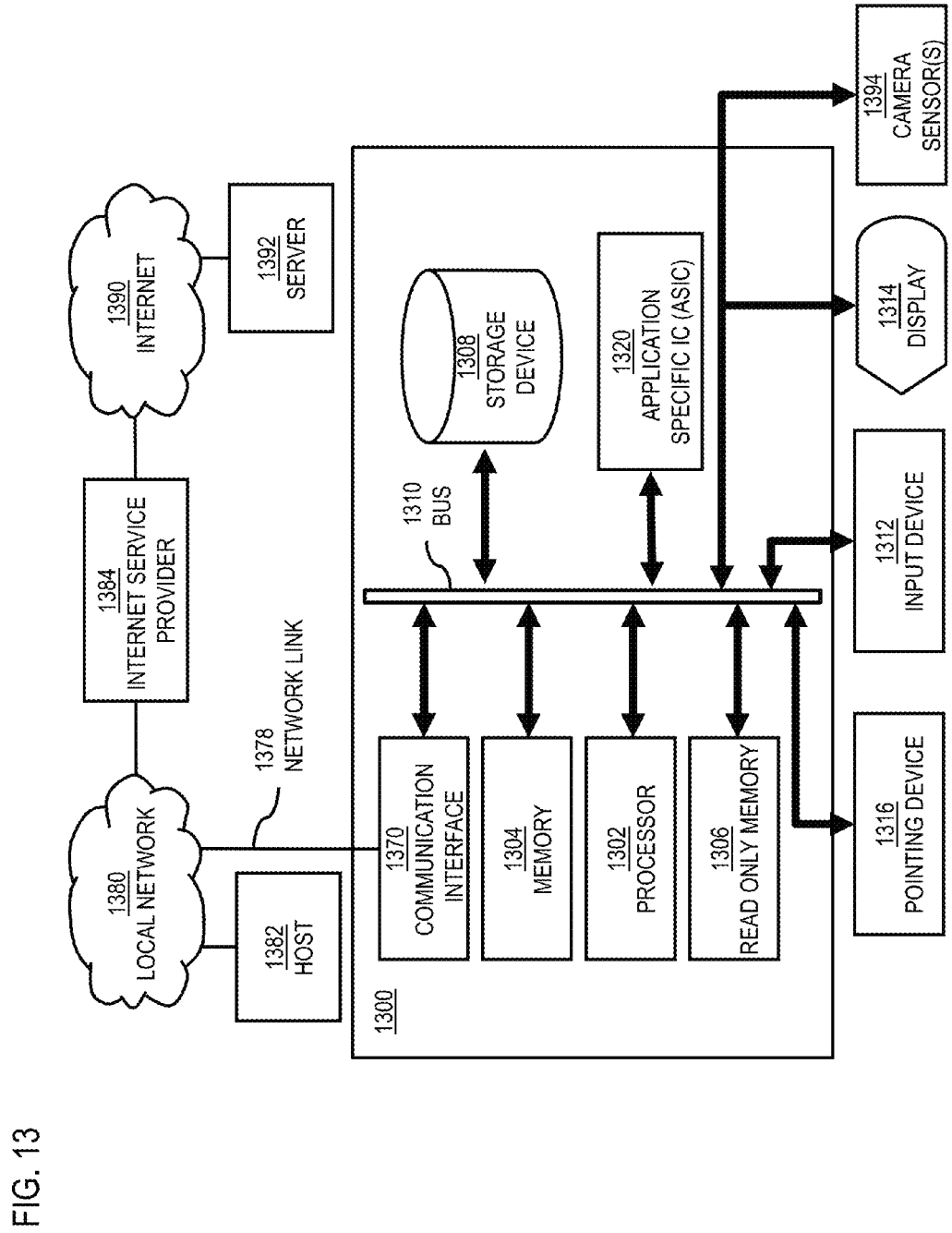
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to process one or more user interactions and/or user gestures with the user interface element to a cause panning for specifying routes with location anchors for a street, and a recentering of the mapping user interface based, at least in part, on the one or more location anchors, as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of processing one or more user interactions and/or user gestures with the user interface element to a cause panning for specifying routes with location anchors for a street, and a recentering of the mapping user interface based, at least in part, on the one or more location anchors.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to processing one or more user interactions and/or user gestures with the user interface element to a cause panning for specifying routes with location anchors for a street, and a recentering of the mapping user interface based, at least in part, on the one or more location anchors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1300 also includes a memory 1304 coupled to bus 1310. The memory 1304, such as a random access memory (RAM) or any other dynamic storage device, stores information including processor instructions for processing one or more user interactions and/or user gestures with the user interface element to a cause panning for specifying routes with location anchors for a street, and a recentering of the mapping user interface based, at least in part, on the one or more location anchors. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost.

Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for processing one or more user interactions and/or user gestures with the user interface element to a cause panning for specifying routes with location anchors for a street, and a recentering of the mapping user interface based, at least in part, on the one or more location anchors, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for processing one or more user interactions and/or user gestures with the user interface element to a cause panning for specifying routes with location anchors for a street, and a recentering of the mapping user interface based, at least in part, on the one or more location anchors to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300.

Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to process one or more user interactions and/or user gestures with the user interface element to a cause panning for specifying routes with location anchors for a street, and a recentering of the mapping user interface based, at least in part, on the one or more location anchors, as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of processing one or more user interactions and/or user gestures with the user interface element to a cause panning for specifying routes with location anchors for a street, and a recentering of the mapping user interface based, at least in part, on the one or more location anchors.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to process one or more user interactions and/or user gestures with the user interface element to a cause panning for specifying routes with location anchors for a street, and a recentering of the mapping user interface based, at least in part, on the one or more location anchors. The memory 1405 also stores the data associated with or generated by the execution of the inventive steps.

Figure 15:
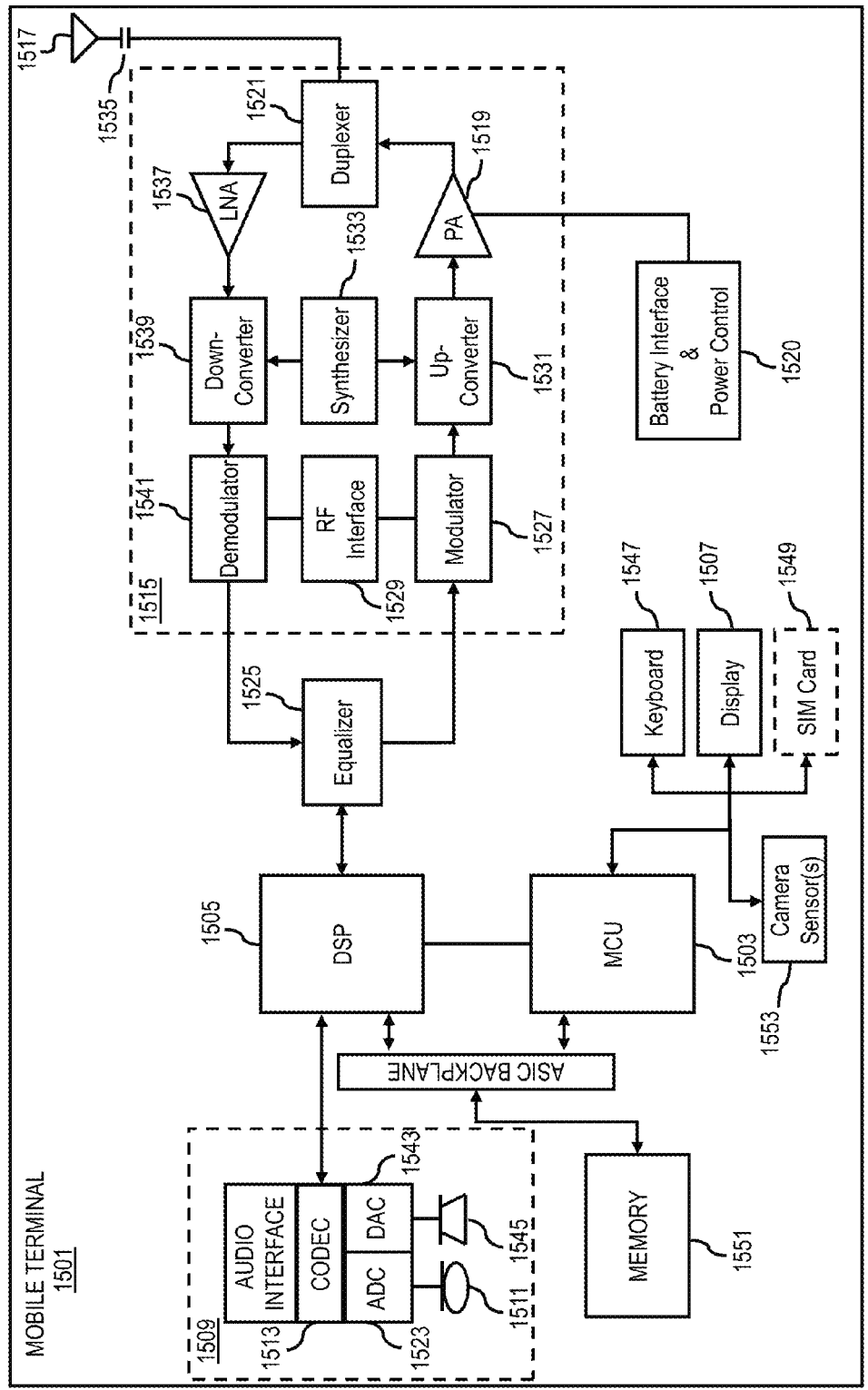
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of processing one or more user interactions and/or user gestures with the user interface element to a cause panning for specifying routes with location anchors for a street, and a recentering of the mapping user interface based, at least in part, on the one or more location anchors. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of processing one or more user interactions and/or user gestures with the user interface element to a cause panning for specifying routes with location anchors for a street, and a recentering of the mapping user interface based, at least in part, on the one or more location anchors. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to process one or more user interactions and/or user gestures with the user interface element to a cause panning for specifying routes with location anchors for a street, and a recentering of the mapping user interface based, at least in part, on the one or more location anchors. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
receiving, by an apparatus, an input specifying a path, a boundary, or a combination thereof associated with at least one panning operation over a mapping user interface; and
in response to a subsequent input at a location outside of the path, the boundary, or a combination thereof, corresponding the location to a location anchor on the path, within the boundary, or a combination thereof, and recentering the mapping user interface based on the location anchor.

2. The method of claim 1, further comprising:
determining one or more parameters for the at least one panning operation based on the path, the boundary, or a combination thereof, wherein the one or more parameters restrict panning in the map interface to the path, the boundary, or a combination thereof,
wherein the one or more parameters include, at least in part, a panning direction parameter, a screen centering parameter, or a combination thereof.

3. The method of claim 1, wherein the path, the boundary, or a combination thereof includes, at least in part, a street, a transport line, a terrain feature, or a combination thereof, and wherein the subsequent input includes a user physical movement to the location outside of the path, the boundary, or a combination thereof.

4. The method of claim 1, further comprising:
determining location anchors on the path, within the boundary, or a combination thereof,
wherein the location anchors include the location anchor.

5. The method of claim 4, wherein the location anchors include, at least in part, one or more points of interest.

6. The method of claim 1, further comprising:
processing the input to determine one or more interactions with the mapping user interface; and
determining one or more sections of the one or more map features to render in the mapping user interface based, at least in part, on the one or more interactions.

7. The method of claim 6, wherein the one or more interactions include, at least in part, a touch-based interaction, a gesture-based interaction, or a combination thereof.

8. The method of claim 1, wherein the subsequent input includes a user gesture on the mapping user interface.

9. The method of claim 1, wherein the boundary defines a park, a mall, or a city.

10. The method of claim 1, wherein the path is a street, the method further comprising:
rendering street number information in conjunction with the path, the boundary, or combination thereof in the mapping user interface during a rendering of the at least one panning operation.

11. An apparatus comprising:
at least one processor; and
at least one memory including computer program code for one or more programs,
the at least one memory and the computer program code configured to, with the at least one processor, cause the apparatus to perform at least the following,
receiving an input specifying a path, a boundary, or a combination thereof associated with at least one panning operation over a mapping user interface; and
in response to a subsequent input at a location outside of the path, the boundary, or a combination thereof, correspond the location to a location anchor on the path, within the boundary, or a combination thereof, and recenter the mapping user interface based on the location anchor.

12. The apparatus of claim 11, wherein the apparatus is further caused to:
determine one or more parameters for the at least one panning operation based on the path, the boundary, or a combination thereof, wherein the one or more parameters restrict panning in the map interface to the path, the boundary, or a combination thereof,
wherein the one or more parameters include, at least in part, a panning direction parameter, a screen centering parameter, or a combination thereof.

13. The apparatus of claim 11, wherein the path, the boundary, or a combination thereof includes, at least in part, a street, a transport line, a terrain feature, or a combination thereof.

14. The apparatus of claim 11, wherein the apparatus is further caused to:
determine location anchors on the path, within the boundary, or a combination thereof,
wherein the location anchors include the location anchor.

15. The apparatus of claim 14, wherein the location anchors include, at least in part, one or more points of interest.

16. The apparatus of claim 11, wherein the apparatus is further caused to:
process and/or facilitating a processing of the input to determine one or more interactions with the mapping user interface; and
determine one or more sections of the one or more map features to render in the mapping user interface based, at least in part, on the one or more interactions.

17. The apparatus of claim 16, wherein the one or more interactions include, at least in part, a touch-based interaction, a gesture-based interaction, or a combination thereof.

18. The apparatus of claim 11, wherein the subsequent input includes a user gesture on the mapping user interface.

19. The apparatus of claim 11, wherein the boundary defines a park, a mall, or a city.

20. The apparatus of claim 1, wherein the path is a street, and wherein the apparatus is further caused to:
rendering street number information in conjunction with the path, the boundary, or combination thereof in the mapping user interface during a rendering of the at least one panning operation.

* * * * *